(12) United States Patent
Maruiwa et al.

(10) Patent No.: US 12,319,304 B2
(45) Date of Patent: Jun. 3, 2025

(54) VEHICLE, AUTOMATED VALET PARKING SYSTEM, AND AUTOMATED VALET PARKING METHOD

(71) Applicant: TOYOTA JIDOSHA KABUSHIKI KAISHA, Toyota (JP)

(72) Inventors: Nobutsugu Maruiwa, Mishima (JP); Tatsuya Sugano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 13 days.

(21) Appl. No.: 17/941,105

(22) Filed: Sep. 9, 2022

(65) Prior Publication Data

US 2023/0117967 A1 Apr. 20, 2023

(30) Foreign Application Priority Data

Oct. 20, 2021 (JP) ................. 2021-171630

(51) Int. Cl.
| | |
|---|---|
| *B60W 50/14* | (2020.01) |
| *B60S 1/56* | (2006.01) |
| *B60W 30/06* | (2006.01) |
| *B60W 50/02* | (2012.01) |
| *B60W 50/029* | (2012.01) |
| *H04W 4/40* | (2018.01) |

(52) U.S. Cl.
CPC ............. *B60W 50/14* (2013.01); *B60S 1/56* (2013.01); *B60W 30/06* (2013.01); *B60W 50/0205* (2013.01); *B60W 50/029* (2013.01); *H04W 4/40* (2018.02); *B60W 2050/0215* (2013.01); *B60W 2050/0292* (2013.01); *B60W 2555/20* (2020.02); *B60W 2556/40* (2020.02); *B60W 2556/45* (2020.02)

(58) Field of Classification Search
CPC .. B60W 50/14; B60W 30/06; B60W 50/0205; B60W 50/029; B60W 2050/0215; B60W 2050/0292; B60W 2555/20; B60W 2556/40; B60W 2556/45; B60S 1/56; H04W 4/40

See application file for complete search history.

(56) References Cited

U.S. PATENT DOCUMENTS

| | | |
|---|---|---|
| 2005/0225744 A1 | 10/2005 | Samukawa et al. |
| 2017/0045611 A1* | 2/2017 | Günzel .................. G01S 7/527 |
| 2019/0283736 A1* | 9/2019 | Watanabe ............. B60W 30/06 |

(Continued)

FOREIGN PATENT DOCUMENTS

| | | |
|---|---|---|
| JP | H08-202998 A | 8/1996 |
| JP | 2005-300307 A | 10/2005 |

(Continued)

*Primary Examiner* — Rufus C Point
(74) *Attorney, Agent, or Firm* — Dinsmore & Shohl LLP

(57) ABSTRACT

A vehicle includes: an in-vehicle sensor that detects an environment around the vehicle; an autonomous driving unit that executes automated valet parking based on the detection result from the in-vehicle sensor; a detection unit that detects dirt or a raindrop attached to the in-vehicle sensor before the automated valet parking is started by the autonomous driving unit; and an informing unit that outputs information that suggests removing the dirt or the raindrop on the in-vehicle sensor in response to the detection unit detecting the dirt or the raindrop attached to the in-vehicle sensor.

9 Claims, 8 Drawing Sheets

(56) References Cited

U.S. PATENT DOCUMENTS

| | | | |
|---|---|---|---|
| 2020/0110407 A1* | 4/2020 | Miura | B60W 50/14 |
| 2020/0180607 A1 | 6/2020 | Choi et al. | |
| 2020/0269834 A1* | 8/2020 | Hara | B60W 10/04 |
| 2021/0039670 A1* | 2/2021 | Sakai | G01S 13/931 |
| 2021/0122362 A1 | 4/2021 | Okamura et al. | |
| 2021/0162988 A1* | 6/2021 | Kang | B62D 15/0285 |
| 2021/0224976 A1* | 7/2021 | Yonezawa | G06T 7/0008 |
| 2021/0248386 A1 | 8/2021 | Takato | |
| 2021/0394774 A1* | 12/2021 | Zhang | G05D 1/0088 |
| 2023/0063930 A1* | 3/2023 | Ichida | G06V 20/597 |

FOREIGN PATENT DOCUMENTS

| | | |
|---|---|---|
| JP | 2018-160087 A | 10/2018 |
| JP | 2019-087049 A | 6/2019 |
| JP | 2021-068304 A | 4/2021 |
| JP | 2021-084626 A | 6/2021 |
| JP | 2021-128459 A | 9/2021 |
| JP | 2021-150792 A | 9/2021 |
| KR | 10-2020-0072597 A | 6/2020 |
| KR | 10-2021-0066984 A | 6/2021 |

\* cited by examiner

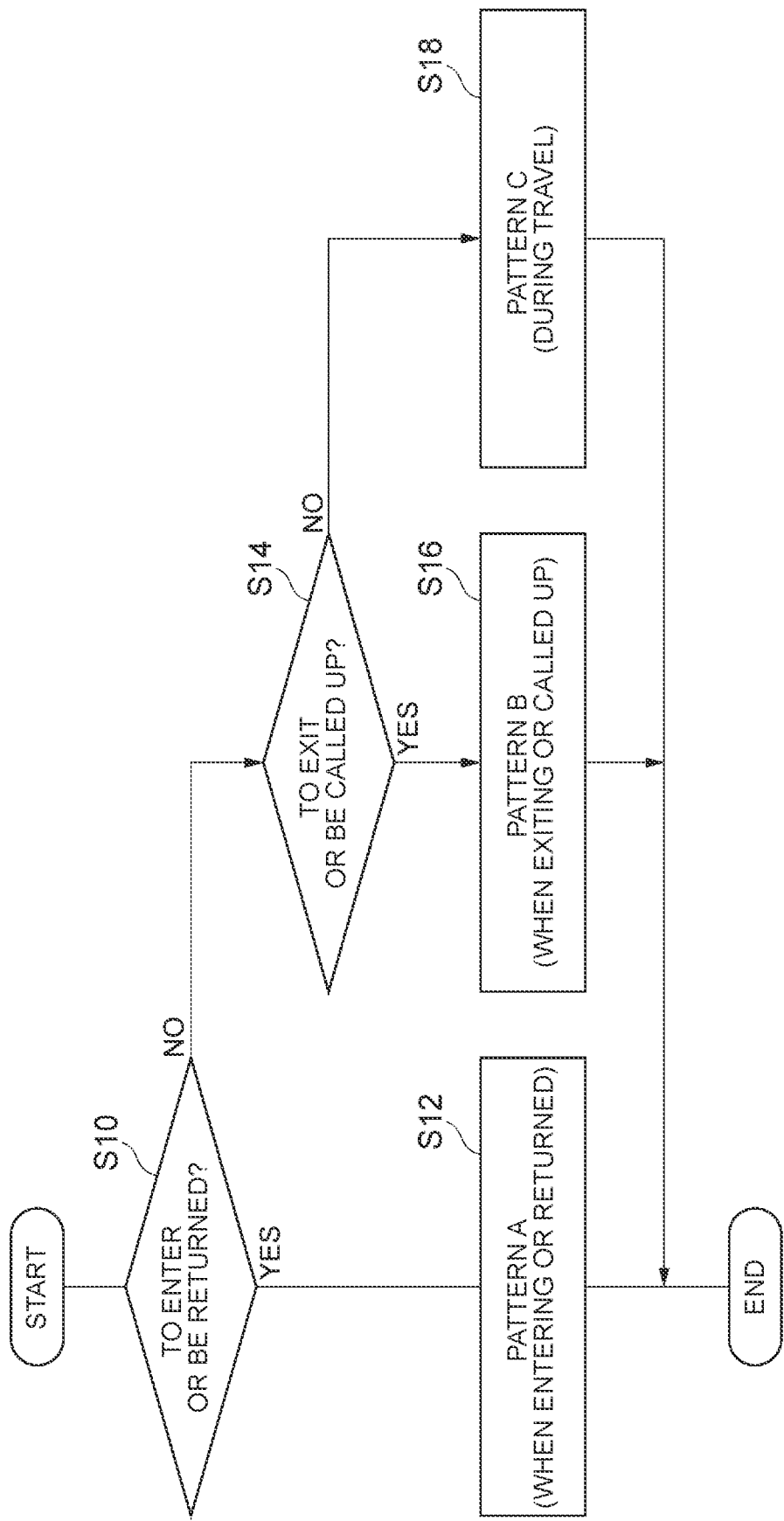

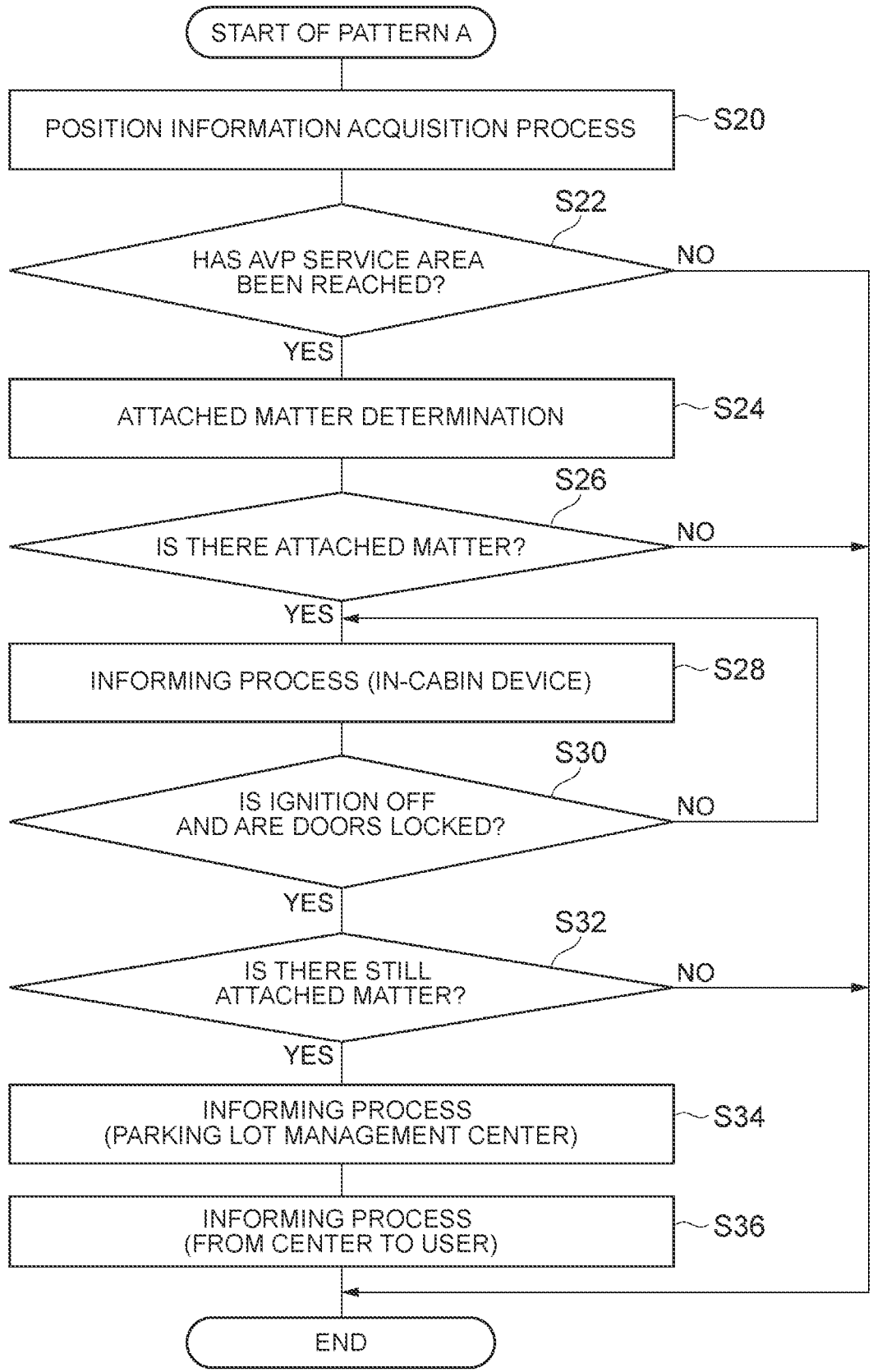

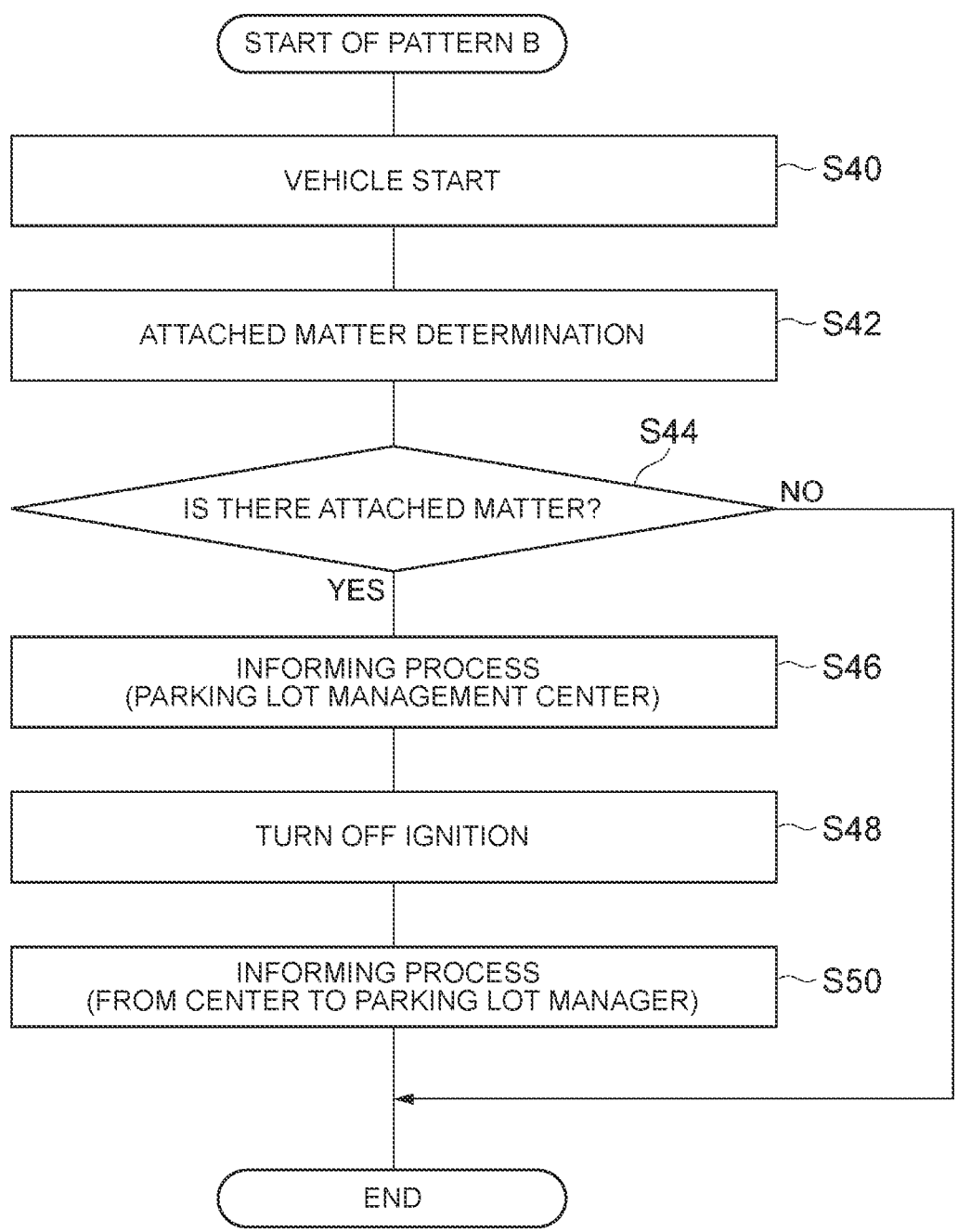

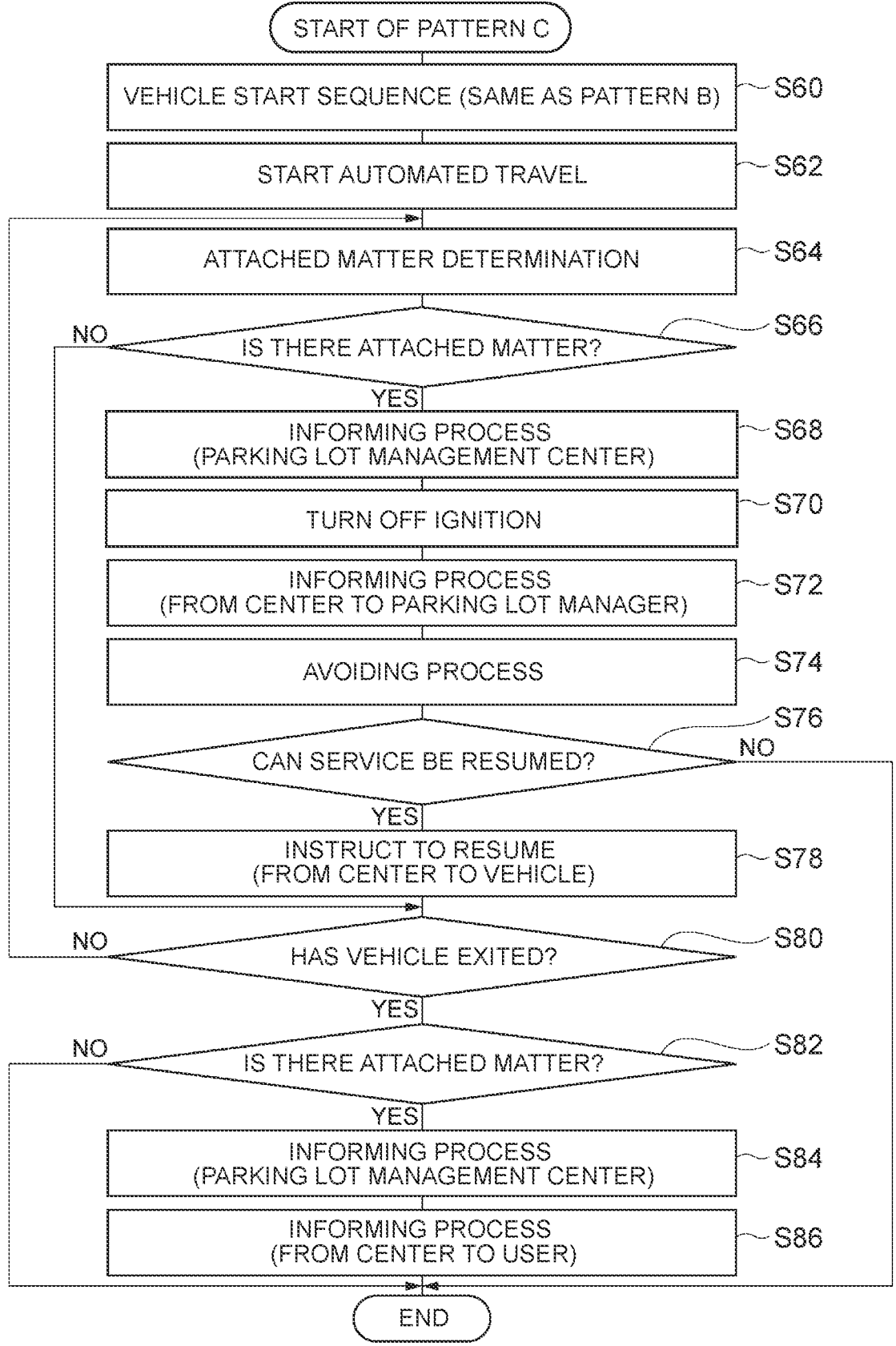

VEHICLE, AUTOMATED VALET PARKING SYSTEM, AND AUTOMATED VALET PARKING METHOD

CROSS-REFERENCE TO RELATED APPLICATION

This application claims priority to Japanese Patent Application No. 2021-171630 filed on Oct. 20, 2021, incorporated herein by reference in its entirety.

BACKGROUND OF THE DISCLOSURE

1. Field of the Disclosure

The present disclosure relates to a vehicle, an automated valet parking system, and an automated valet parking method.

2. Description of Related Art

Japanese Unexamined Patent Application Publication No. 2018-160087 discloses a valet parking system that allows a vehicle to autonomously travel to a parking position to be parked. The system allows the vehicle to be automatically parked based on the detection result from an in-vehicle sensor.

SUMMARY OF THE DISCLOSURE

Raindrops may be attached to the in-vehicle sensor in the rainy weather, for example, and therefore a landmark or an obstacle that is present in a parking lot may not be detected using the in-vehicle sensor. That is, the system may not continue the parking service in the rainy weather etc. The present disclosure provides a technique of avoiding interruption or discontinuation of a parking service due to the malfunction of an in-vehicle sensor.

An aspect of the present disclosure provides a vehicle including an in-vehicle sensor, an autonomous driving unit, a detection unit, and an informing unit. The in-vehicle sensor detects an environment around the vehicle. The autonomous driving unit executes automated valet parking based on a detection result from the in-vehicle sensor. The detection unit detects dirt on the in-vehicle sensor or a raindrop attached to the in-vehicle sensor before the automated valet parking is started by the autonomous driving unit. The informing unit outputs information that suggests removing the dirt on the in-vehicle sensor or the raindrop attached to the in-vehicle sensor in response to the detection unit detecting the dirt on the in-vehicle sensor or the raindrop attached to the in-vehicle sensor.

In the vehicle, the detection unit detects the dirt on the in-vehicle sensor or the raindrop attached to the in-vehicle sensor before the automated valet parking is started. Then, information that suggests removing the dirt on the in-vehicle sensor or the raindrop attached to the in-vehicle sensor is output in response to detecting the dirt on the in-vehicle sensor or the raindrop attached to the in-vehicle sensor. Consequently, the output information is transmitted to a user that receives the parking service or a manager of the parking lot. That is, the vehicle can prompt the user or the manager to wipe off the dirt or the raindrop. In this manner, the vehicle actively interacts with the user or the manager so that the in-vehicle sensor is rendered usable. As a result, interruption or discontinuation of the parking service can be avoided.

In one embodiment, the informing unit may be configured to output the information to an in-cabin device of the vehicle when the dirt on the in-vehicle sensor or the raindrop attached to the in-vehicle sensor is detected before a user gets off the vehicle, and to output the information to at least one of a terminal of the user, an external device of the vehicle, and a terminal of a parking lot manager when the dirt on the in-vehicle sensor or the raindrop attached to the in-vehicle sensor is detected after the user gets off the vehicle. In this case, the vehicle can transmit the information to the user in the vehicle via the in-cabin device, and transmit the information to the user outside the vehicle or the parking lot manager via the external device or the terminal.

In one embodiment, the informing unit may output the information to a terminal of a parking lot manager when the dirt on the in-vehicle sensor or the raindrop attached to the in-vehicle sensor is detected when the vehicle is operating to exit from a parking lot. It is highly possible that the parking lot manager is positioned closer to the vehicle than the user is when the vehicle exits from the parking lot. The vehicle can interact with the parking lot manager who can wipe off the dirt or the raindrop when the vehicle exits from the parking lot so that the in-vehicle sensor can be used continuously.

In one embodiment, the autonomous driving unit may evacuate the vehicle to an evacuation position when the dirt on the in-vehicle sensor or the raindrop attached to the in-vehicle sensor is detected during the automated valet parking of the vehicle; and the informing unit may output the information to at least one of a terminal of a user, an exterior device of the vehicle, and a terminal of a parking lot manager. In this case, the vehicle can avoid interruption or discontinuation of the parking service while securing safety.

In one embodiment, the vehicle may determine whether an automated valet parking (AVP) service area has been reached based on a present vehicle position and map information on the AVP service area, the AVP service area being an area in which an automated valet parking service is provided. In this case, the vehicle can avoid interruption or discontinuation of the parking service while securing safety.

In one embodiment, the detection unit may execute detection of dirt on the in-vehicle sensor or a raindrop attached to the in-vehicle sensor when the vehicle determines that the vehicle has reached the AVP service area. In this case, the vehicle can avoid interruption or discontinuation of the parking service while securing safety.

In one embodiment, the detection unit may execute detection of dirt on the in-vehicle sensor or a raindrop attached to the in-vehicle sensor when ignition of the vehicle is turned on. In this case, the vehicle can avoid interruption or discontinuation of the parking service while securing safety.

In one embodiment, the detection unit may execute detection of dirt on the in-vehicle sensor or a raindrop attached to the in-vehicle sensor when the vehicle is autonomously driven by the autonomous driving unit. In this case, the vehicle can avoid interruption or discontinuation of the parking service while securing safety.

Another aspect of the present disclosure provides an automated valet parking system including a vehicle and a server. Automated valet parking is executable for the vehicle. The server is configured to be communicable with the vehicle. The vehicle includes an in-vehicle sensor, an autonomous driving unit, a detection unit, and an informing unit. The in-vehicle sensor detects an environment around the vehicle. The autonomous driving unit executes the automated valet parking based on a detection result from the in-vehicle sensor in response to a parking lot entry-exit instruction from the server. The detection unit detects dirt on the in-vehicle sensor or a raindrop attached to the in-vehicle sensor before the automated valet parking is started by the autonomous driving unit. The informing unit outputs information that suggests removing the dirt on the in-vehicle sensor or the raindrop attached to the in-vehicle sensor in response to the detection unit detecting the dirt or the raindrop attached to the in-vehicle sensor. The automated valet parking system achieves the same effect as that achieved by the vehicle discussed above.

Still another aspect of the present disclosure provides an automated valet parking method including: executing automated valet parking based on a detection result from an in-vehicle sensor of a vehicle; detecting dirt on the in-vehicle sensor or a raindrop attached to the in-vehicle sensor before the automated valet parking is started; and outputting information that suggests removing the dirt on the in-vehicle sensor or the raindrop attached to the in-vehicle sensor in response to detecting the dirt or the raindrop attached to the in-vehicle sensor. The automated valet parking method achieves the same effect as that achieved by the vehicle discussed above.

With the present disclosure, a technique of avoiding interruption or discontinuation of a parking service due to the malfunction of an in-vehicle sensor is provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a flowchart illustrating operation of the automated valet parking system;

FIG. 6 is a flowchart for a pattern A;

FIG. 7 is a flowchart for a pattern B; and

FIG. 8 is a flowchart for a pattern C.

DETAILED DESCRIPTION OF EMBODIMENTS

An embodiment of the present disclosure will be described below with reference to the drawings.

Figure 1:
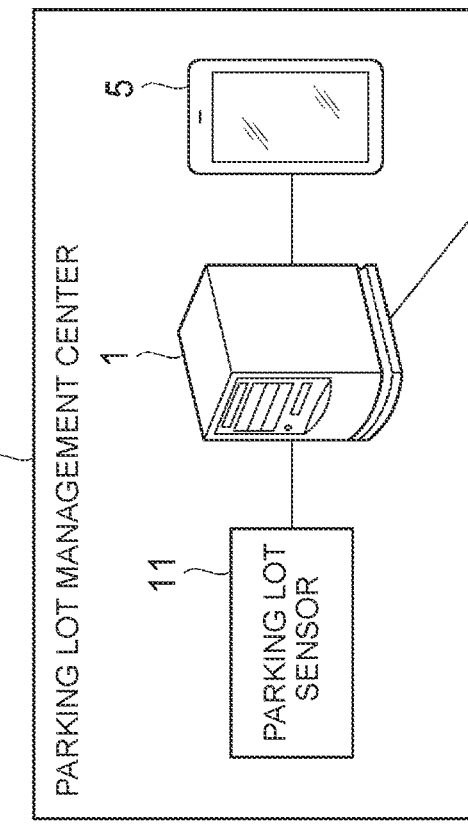
FIG. 1 illustrates automated valet parking implemented by an automated valet parking system according to an embodiment.
Figure 1:
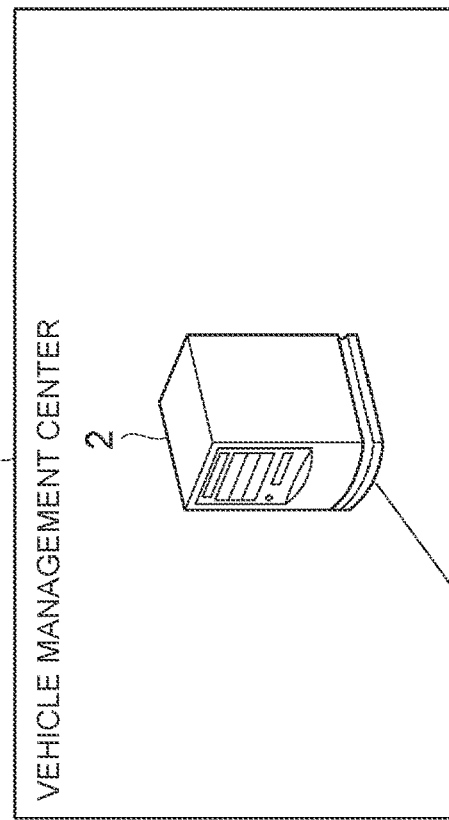
Figure 1:
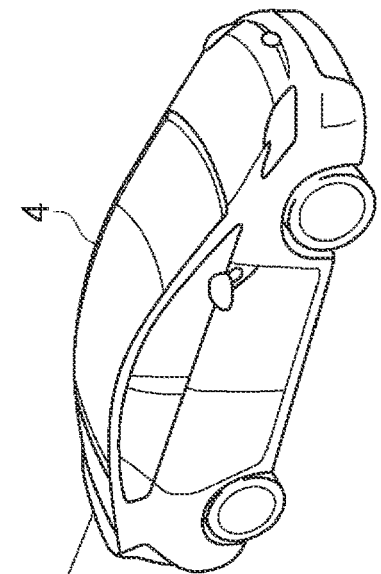

FIG. 1 illustrates automated valet parking implemented by an automated valet parking system according to an embodiment. An automated valet parking system (AVPS) 100 illustrated in FIG. 1 is a system for implementing automated valet parking (AVP) in a parking lot.

The automated valet parking is a service that allows an unmanned autonomous driving vehicle 4, from which a user (occupant) has dropped off at a drop-off area in a parking lot, to travel along a target route as instructed by the parking lot (automated valet parking system 100) to be automatically parked in a target parking space in the parking lot. The target parking space is a parking space set in advance as the parking position for the autonomous driving vehicle. The target route is a route in the parking lot along which the autonomous driving vehicle travels to reach the target parking space. The target route for exiting from the parking lot is a route along which the vehicle travels to reach a pick-up space to be discussed later.

To use the automated valet parking, a parking lot entry reservation is made. The parking lot entry reservation is a reservation for entering the parking lot in which the automated valet parking is provided. The parking lot entry reservation includes an expected entry time, reserving vehicle information, and reserving user information. The parking lot entry reservation may also include an expected exit time.

In the automated valet parking, the automated valet parking system 100 is given the authority to operate the autonomous driving vehicle 4. The process of providing the automated valet parking system 100 with the authority to operate the autonomous driving vehicle 4 is called "check-in". The check-in may be performed using an authentication code that the user that has made a parking lot entry reservation can request. The authentication code is a code that is used to confirm whether the user that has made a parking lot entry reservation and the autonomous driving vehicle 4 as the target for the parking lot entry reservation are the same as the user and the autonomous driving vehicle 4 that are to use the automated valet parking in the parking lot.

The process of completing the automated valet parking with the provision of the authority to operate the automated valet parking system 100 terminated is called "check-out". The check-out may also be performed using an authentication code for the check-out.

Figure 2:
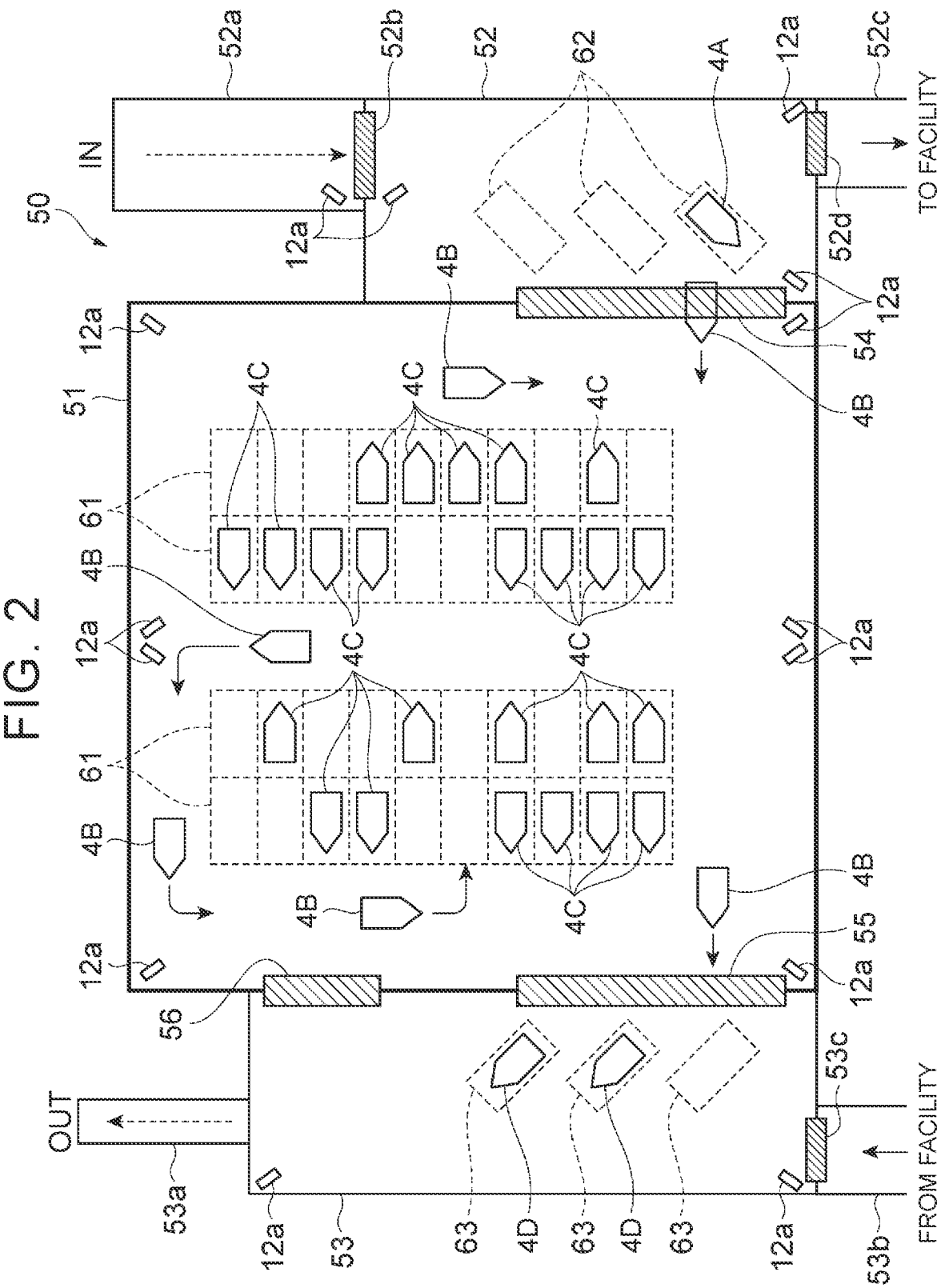
FIG. 2 is a plan view illustrating an example of a parking lot in which the automated valet parking is implemented.

FIG. 2 is a plan view illustrating an example of a parking lot in which the automated valet parking is implemented. A parking lot 50 for the automated valet parking illustrated in FIG. 2 includes a parking area 51, a drop-off area 52, and a pick-up area 53. The parking lot 50 is provided with a plurality of monitoring cameras 12a that constitute a parking lot sensor 11.

The parking area 51 is a place in which parking spaces (parking boxes) 61 in which the autonomous driving vehicle 4 is to be parked through the automated valet parking are formed. A plurality of parking spaces 61 are formed as arranged in one direction (e.g. the direction of the vehicle width of vehicles to be parked) as illustrated in FIG. 2, for example.

The drop-off area 52 is a place provided on the side of the entrance to the parking lot 50 to allow occupants, including the user, to get off the autonomous driving vehicle 4 before entering the parking lot. Drop-off spaces 62 are formed in the drop-off area 52 to allow the autonomous driving vehicle 4 to be stopped to allow the occupants to get off the vehicle. The drop-off area 52 communicates with the parking area 51 via a parking lot entry gate 54.

An entrance travel path 52a is connected to the drop-off area 52. An entrance gate 52b is provided between the drop-off area 52 and the entrance travel path 52a. The entrance travel path 52a is a travel path connected to a general road etc. outside the parking lot 50 to be traveled by the autonomous driving vehicle 4 to enter the parking lot 50. The entrance gate 52b is a gate that reduces entry of vehicles that are not subjected to the automated valet parking (e.g. general vehicles that do not have an autonomous driving function) to the drop-off area 52. For example, the entrance gate 52b may permit passage of a vehicle that travels through the entrance travel path 52a when the parking lot management server 1 recognizes a vehicle number on a license plate of the vehicle from an image captured by the monitoring camera 12a and it is confirmed that the vehicle is a vehicle for which a parking lot entry reservation for the parking lot 50 has been made.

The drop-off area 52 is connected to a facility entry passage 52c that allows the user who has dropped off from the autonomous driving vehicle 4 to enter a facility such as a commercial facility. An entry automatic door 52d is provided between the drop-off area 52 and the facility entry passage 52c. The facility entry passage 52c is a passage that allows the user to enter the facility from the parking lot 50. A check-in reception device may be disposed in the facility entry passage 52c. The user checks in using the check-in reception device to start the automated valet parking.

The pick-up area 53 is a place provided on the side of the exit from the parking lot 50 to allow the occupants to ride on the autonomous driving vehicle 4 that has come out of the parking lot. Pick-up spaces 63 are formed in the pick-up area 53 to allow the autonomous driving vehicle 4 to stand by for the occupants to ride on the vehicle. The pick-up area 53 communicates with the parking area 51 via a parking lot exit gate 55. A return gate 56 may be provided between the pick-up area 53 and the parking area 51 to allow the autonomous driving vehicle 4 to return from the pick-up area 53 to the parking area 51.

An exit travel path 53a is connected to the pick-up area 53. The exit travel path 53a is a travel path that allows the autonomous driving vehicle 4 on which the user has ridden in the pick-up area 53 to exit from the parking lot 50. An exit gate may be provided between the pick-up area 53 and the exit travel path 53a.

The pick-up area 53 is connected to a facility exit passage 53b through which the user passes to return from a facility such as a commercial facility to the parking lot 50. An exit automatic door 53c is provided between the pick-up area 53 and the facility exit passage 53b. The facility exit passage 53b is a passage that allows the user to exit from the facility and enter the parking lot 50. A check-out reception device may be disposed in the facility exit passage 53b. The user checks out using the check-out reception device to ride on the autonomous driving vehicle 4 and exit from the parking lot 50.

It is not necessary that the drop-off area 52 and the pick-up area 53 should be provided separately, and the drop-off area 52 and the pick-up area 53 may be provided as an integral drop-off/pick-up area.

FIG. 2 illustrates an autonomous driving vehicle 4A which is stationary in the drop-off space 62 in the drop-off area 52, autonomous driving vehicles 4B which are traveling in the parking lot 50, autonomous driving vehicles 4C which are parked in the parking spaces 61 in the parking area 51, and autonomous driving vehicles 4D which are stationary in the pick-up spaces 63 in the pick-up area 53.

The automated valet parking system 100 starts the automated valet parking when the authority to instruct the autonomous driving vehicle 4 is obtained after the autonomous driving vehicle 4 enters the parking lot 50 and the occupants get off the autonomous driving vehicle 4 in the drop-off space 62 (corresponding to the autonomous driving vehicle 4A), for example. The automated valet parking system 100 causes the autonomous driving vehicle 4 to travel toward the target parking space in the parking area 51 (corresponding to the autonomous driving vehicle 4B), and parks the autonomous driving vehicle 4 in the target parking space (corresponding to the autonomous driving vehicle 4C). The automated valet parking system 100 causes the autonomous driving vehicle 4, which has been parked, to travel toward the pick-up area 53 in response to a pick-up request, and to stand by in the pick-up space 63 until the occupants arrive (corresponding to the autonomous driving vehicle 4D).

Configuration of Automated Valet Parking System

As illustrated in FIG. 1, the automated valet parking system 100 includes a parking lot management server 1. The parking lot management server 1 is a server that manages a parking lot. The parking lot management server 1 is connected to a parking lot sensor 11 provided in the parking lot 50, and disposed in a parking lot management center Ps, for example. The parking lot management server 1 is connected to a management terminal 5 for a parking lot manager, and communicates with the parking lot manager via the management terminal 5.

The parking lot management server 1 is communicably connected to the vehicle management server 2. The vehicle management server 2 is a server that manages an autonomous driving vehicle, and is disposed in a vehicle management center Cs, for example. It is not necessary that the automated valet parking system 100 should include all components of the vehicle management server 2, and it is only necessary that the automated valet parking system 100 should include components related to the function of implementing the automated valet parking.

The parking lot management server 1 and the vehicle management server 2 are each configured to be communicable with a user front-end 3 and the autonomous driving vehicle 4. The parking lot management server 1 and the vehicle management server 2 may be configured to be communicable with the user front-end 3 or the autonomous driving vehicle 4 by way of each other. The user front-end 3 is a portable information terminal of a reserving user that has made a parking lot entry reservation for the automated valet parking. The autonomous driving vehicle 4 is an autonomous driving vehicle determined by the reserving user as the target for the parking lot entry reservation for the automated valet parking.

The parking lot management server 1 is configured to be able to acquire information on the autonomous driving vehicle 4 and the user via the vehicle management server 2. The parking lot management server 1 is configured to be able to execute a series of processes for the automated valet parking, such as collating the user that has made a parking lot entry reservation, check-in, requesting the vehicle to start an engine, requesting the vehicle to travel, requesting the vehicle to stop, and check-out.

Figure 3:
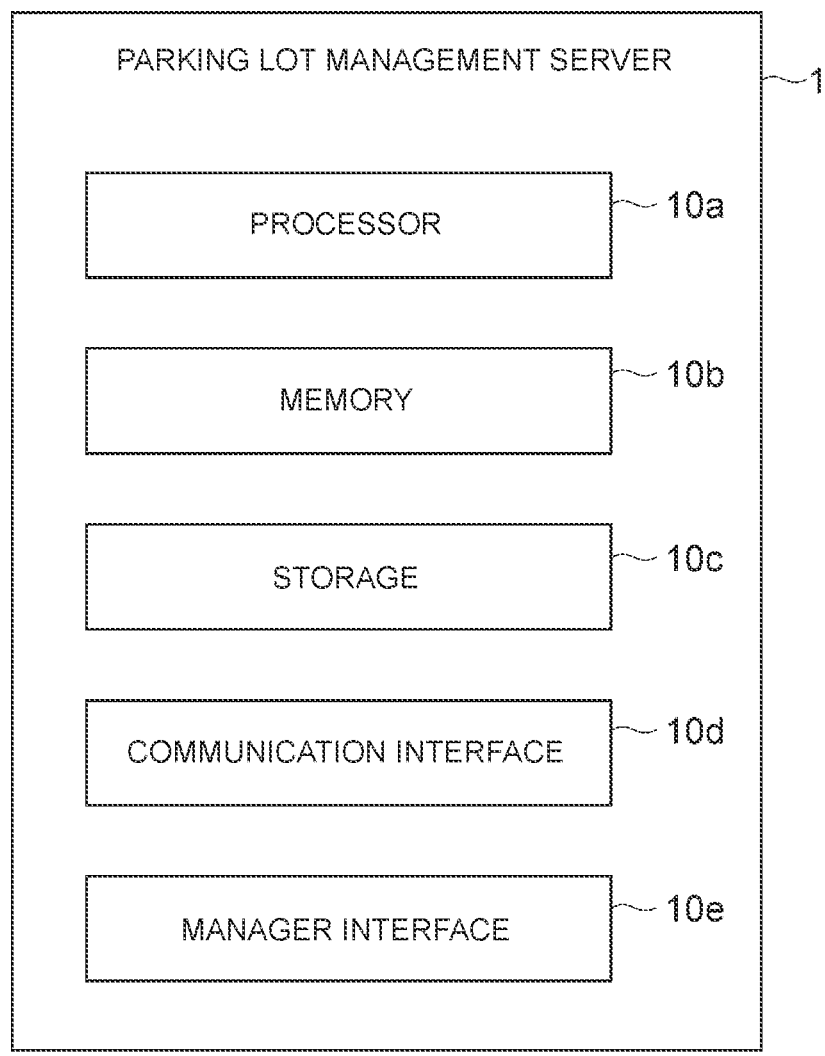
FIG. 3 is a block diagram illustrating an example of the hardware configuration of a parking lot management server.

FIG. 3 is a block diagram illustrating an example of the hardware configuration of the parking lot management server. As illustrated in FIG. 3, the parking lot management server 1 is constituted as a common computer that includes a processor 10a, a memory 10b, a storage 10c, a communication interface 10d, and a manager interface 10e.

The processor 10a controls the parking lot management server 1 by causing various operating systems to operate. The processor 10a is a computer such as a central processing unit (CPU) that includes a control device, a computation device, a register, etc. The processor 10a integrally controls the memory 10b, the storage 10c, the communication interface 10d, and the manager interface 10e. The memory 10b is a storage medium such as a read only memory (ROM) and a random access memory (RAM). The storage 10c is a storage medium such as a hard disk drive (HDD).

The communication interface 10d is a communication device for wireless communication via a network. The communication interface 10d may be a network device, a network controller, a network card, etc. The parking lot management server 1 communicates with the autonomous driving vehicle 4 and the user front-end 3 using the communication interface 10*d*. The manager interface 10*e* is an input/output unit of the parking lot management server 1 for a manager etc. of the parking lot management server 1. The manager interface 10*e* includes an output unit such as a display and a speaker and an input unit such as a touch panel. The vehicle management server 2, the user front-end 3, and the management terminal 5 may have the same hardware configuration as that of the parking lot management server 1 discussed above. The parking lot management server 1 may be configured to have the same physical hardware as that of the vehicle management server 2. The user front-end 3 and the management terminal 5 may be a smartphone, or may be a tablet or notebook portable information terminal.

Autonomous Driving Vehicle

Figure 4:
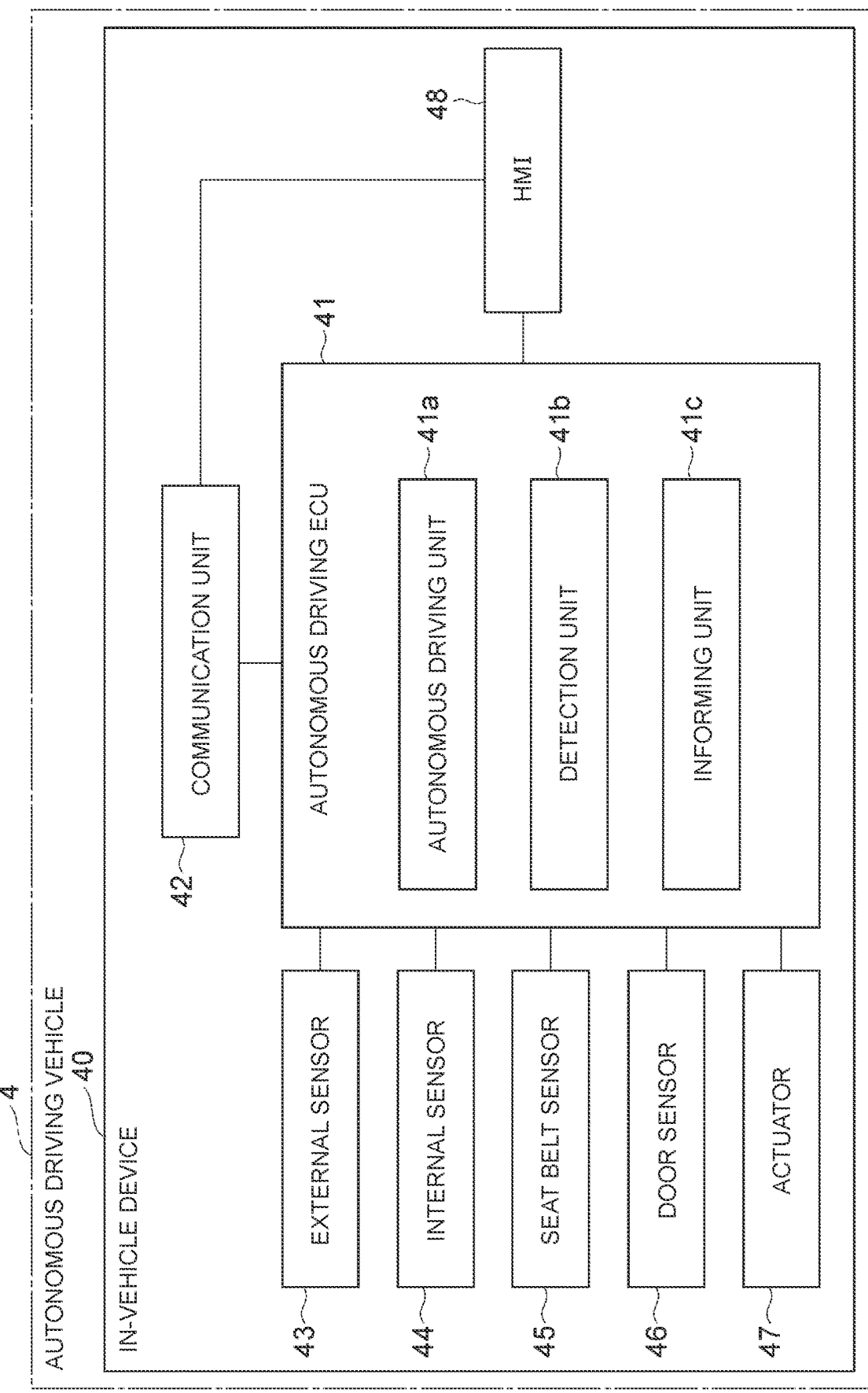
FIG. 4 is a block diagram illustrating an example of the configuration of an autonomous driving vehicle.

FIG. 4 is a block diagram illustrating an example of the configuration of the autonomous driving vehicle 4. As illustrated in FIG. 4, the autonomous driving vehicle 4 includes an in-vehicle device 40. The in-vehicle device 40 is an autonomous driving system, by way of example. The in-vehicle device 40 includes an autonomous driving electronic control unit (ECU) 41. The autonomous driving ECU 41 is an electronic control unit that includes a CPU, a ROM, a RAM, etc. The autonomous driving ECU 41 implements various functions by loading a program stored in the ROM to the RAM, and the CPU executing a program stored in the ROM and loaded into the RAM, for example. The autonomous driving ECU 41 may be constituted from a plurality of electronic units.

The autonomous driving ECU 41 is connected to a communication unit 42, an external sensor 43 (an example of the in-vehicle sensor), an internal sensor 44, a seat belt sensor 45, a door sensor 46, an actuator 47, and a human-machine interface (HMI) 48.

The communication unit 42 is a communication device that controls wireless communication with the outside of the autonomous driving vehicle 4. The communication unit 42 transmits and receives various kinds of information through communication with the parking lot management server 1. The communication unit 42 transmits vehicle information to the parking lot management server 1, and acquires information that is necessary for the automated valet parking from the parking lot management server 1 (e.g. information on a landmark located along the target route), for example. The communication unit 42 may be configured to be able to communicate with the vehicle management server 2, the user front-end 3, and the management terminal 5.

The external sensor 43 is an in-vehicle sensor that detects the external environment of the autonomous driving vehicle 4. The external sensor 43 includes at least a camera. The camera is an image capture device that captures an image of the external environment of the autonomous driving vehicle 4. The camera is provided on the back side of a windshield of the autonomous driving vehicle 4 to capture an image of a scene ahead of the vehicle, for example. The camera transmits captured image information about the external environment of the autonomous driving vehicle 4 to the autonomous driving ECU 41. The camera may be a monocular camera, or may be a stereo camera. A plurality of cameras may be provided to capture images of scenes ahead of, to the right and left sides of, and to the rear of the autonomous driving vehicle 4.

The external sensor 43 may include a radar sensor. The radar sensor is a detection device that detects an object around the autonomous driving vehicle 4 using radio waves (e.g. millimeter waves) or light. The radar sensor includes a millimeter wave radar or a light detection and ranging (LIDAR), for example. The radar sensor transmits radio waves or light to an area around the autonomous driving vehicle 4, and detects an object by receiving radio waves or light reflected from the object. The radar sensor transmits information on the detected object to the autonomous driving ECU 41. The external sensor 43 may include a sonar sensor that detects a sound from the outside of the autonomous driving vehicle 4.

The internal sensor 44 is an in-vehicle sensor that detects the travel state of the autonomous driving vehicle 4. The internal sensor 44 includes a vehicle speed sensor, an acceleration sensor, and a yaw rate sensor. The seat belt sensor 45 is a sensor provided for each seat of the autonomous driving vehicle 4 to detect whether an occupant wears a seat belt. The door sensor 46 is a sensor that detects whether doors of the autonomous driving vehicle 4 are open or closed.

The actuator 47 is a device that is used to control the autonomous driving vehicle 4. The actuator 47 includes at least a drive actuator, a brake actuator, and a steering actuator. The drive actuator controls a drive force of the autonomous driving vehicle 4 by controlling the amount of air to be supplied to the engine (throttle valve opening degree) in accordance with a control signal from the autonomous driving ECU 41. When the autonomous driving vehicle 4 is a hybrid electric vehicle, the drive force is controlled in accordance with a control signal input from the autonomous driving ECU 41 to a motor that serves as a power source, besides the amount of air to be supplied to the engine. When the autonomous driving vehicle 4 is a battery electric vehicle, the drive force is controlled in accordance with a control signal input from the autonomous driving ECU 41 to a motor that serves as a power source. The motor that serves as a power source in such cases constitutes the actuator 47.

The brake actuator controls a brake system in accordance with a control signal from the autonomous driving ECU 41, and controls a braking force to be applied to wheels of the autonomous driving vehicle 4. The brake system may be a hydraulic brake system, for example. The steering actuator controls drive of an assist motor that controls steering torque, of an electric power steering system, in accordance with a control signal from the autonomous driving ECU 41. Consequently, the steering actuator controls steering torque of the autonomous driving vehicle 4.

The HMI 48 is an interface for inputting and outputting information between a reserving user that rides on the autonomous driving vehicle 4 and the in-vehicle device 40. The HMI 48 includes an output unit such as a display and a speaker and an input unit such as a touch panel and a button, for example.

The autonomous driving ECU 41 includes an autonomous driving unit 41*a*, a detection unit 41*b*, and an informing unit 41*c*.

The autonomous driving unit 41*a* recognizes the external environment of the autonomous driving vehicle 4 based on the detection result from the external sensor 43 (an image captured by the camera or information on an object detected by the radar sensor). The external environment includes the position of an object around the autonomous driving vehicle 4 relative to the autonomous driving vehicle 4. The external environment may include the speed and the direction of movement of an object around the autonomous driving vehicle 4 relative to the autonomous driving vehicle 4. The autonomous driving unit 41*a* recognizes an object such as a different vehicle and a column in the parking lot through pattern matching etc. The autonomous driving unit 41*a* may recognize a gate of the parking lot, a wall of the parking lot, a pole, a traffic cone, etc. The autonomous driving unit 41a may also recognize a travel boundary in the parking lot by recognizing a white line.

The autonomous driving unit 41a recognizes the travel state of the autonomous driving vehicle 4 based on the detection result from the internal sensor 44. The travel state includes the vehicle speed of the autonomous driving vehicle 4, the acceleration of the autonomous driving vehicle 4, and the yaw rate of the autonomous driving vehicle 4. Specifically, the autonomous driving unit 41a recognizes the vehicle speed of the autonomous driving vehicle 4 based on vehicle speed information from the vehicle speed sensor. The autonomous driving unit 41a recognizes the acceleration of the autonomous driving vehicle 4 based on acceleration information from the acceleration sensor. The autonomous driving unit 41a recognizes the direction of the autonomous driving vehicle 4 based on yaw rate information from the yaw rate sensor.

The autonomous driving unit 41a recognizes the position of the autonomous driving vehicle 4 in the parking lot based on parking lot map information acquired from the parking lot management server 1 through the communication unit 42 and the external environment recognized by the autonomous driving unit 41a.

The autonomous driving unit 41a recognizes the position of the autonomous driving vehicle 4 in the parking lot based on position information on a landmark in the parking lot included in the parking lot map information and the position of the landmark relative to the autonomous driving vehicle 4 recognized by the autonomous driving unit 41a. The landmark may be an object provided in the parking lot in a fixed manner. The landmark may be at least one of a column in the parking lot, a wall in the parking lot, a pole, a traffic cone, etc., for example.

The autonomous driving unit 41a provides vehicle information to the parking lot management server 1 through the communication unit 42. The autonomous driving unit 41a provides vehicle information for determining whether a condition for starting the automated valet parking is met in the parking lot management server 1. The autonomous driving unit 41a provides the parking lot management server 1 with failure information about an abnormality in the vehicle and stop information indicating that the engine of the autonomous driving vehicle 4 is stopped as the vehicle information.

The autonomous driving unit 41a may provide the parking lot management server 1 with information indicating that no people are present in a vehicle cabin of the autonomous driving vehicle 4 based on the detection result from the seat belt sensor 45. The autonomous driving unit 41a may also provide the parking lot management server 1 with information indicating that all the doors of the autonomous driving vehicle 4 are locked based on the detection result from the door sensor 46. The autonomous driving unit 41a may provide the parking lot management server 1 with vehicle body information such as the model of the autonomous driving vehicle 4 and the length, the width, the turning radius of the vehicle.

The autonomous driving unit 41a executes autonomous driving of the autonomous driving vehicle 4 based on a parking lot entry-exit instruction from the parking lot management server 1. In the autonomous driving, the autonomous driving vehicle 4 is caused to travel autonomously along a target route specified by the parking lot management server 1. The autonomous driving unit 41a generates a trajectory for the autonomous driving vehicle 4 based on the target route, the position of the autonomous driving vehicle 4, the external environment of the autonomous driving vehicle 4, and the travel state of the autonomous driving vehicle 4, for example. The trajectory corresponds to a travel plan for the autonomous driving. The trajectory includes a path along which the vehicle travels in the autonomous driving and a vehicle speed plan for the autonomous driving. The autonomous driving unit 41a can start the engine of the autonomous driving vehicle 4 when the engine is stopped, and stop the engine of the autonomous driving vehicle 4 when the engine is driven.

The detection unit 41b detects dirt on the external sensor 43 or a raindrop attached to the external sensor 43 before the automated valet parking is started by the autonomous driving unit 41a. The detection unit 41b acquires a field-of-view range (recognizable area) of the external sensor 43 in advance, and stores the acquired field-of-view range in a storage device etc. as a reference field-of-view range, for example. The detection unit 41b observes the field-of-view range of the external sensor 43, and detects dirt or a raindrop attached to the external sensor 43 by comparing the observed field-of-view range and the reference field-of-view range. The detection unit 41b determines that dirt or a raindrop is attached to the external sensor 43 when the observed field-of-view range has become a predetermined proportion of the reference field-of-view range or less. The detection unit 41b may detect dirt on the external sensor 43 or a raindrop attached to the external sensor 43 based on an image acquired by a sensor (e.g. the monitoring camera 12a) provided outside the vehicle.

The informing unit 41c outputs wiping information that suggests removing dirt on the external sensor 43 or a raindrop attached to the external sensor 43 in response to the detection unit 41b detecting dirt on the external sensor 43 or a raindrop attached to the external sensor 43. The wiping information includes information that specifies the relevant external sensor 43, error information, warning information, information that indicates wiping operation, etc., for example. The informing unit 41c outputs the wiping information to the HMI 48 which is an in-vehicle device or the user front-end 3 and the management terminal 5 which are portable terminals, by way of example, in order to inform a person that may be present near the autonomous driving vehicle 4. The output wiping information is transmitted to a person (user and/or manager) in the form of a sound, video, etc. via the HMI 48, the user front-end 3, and the management terminal 5.

The informing unit 41c outputs wiping information to an in-cabin device of the autonomous driving vehicle 4 when dirt on the external sensor 43 or a raindrop attached to the external sensor 43 is detected before the user gets off the autonomous driving vehicle 4. Consequently, the autonomous driving vehicle 4 can request the user in the vehicle to wipe the external sensor 43. The informing unit 41c may output wiping information to at least one of the user front-end 3 and the management terminal 5 when dirt on the external sensor 43 or a raindrop attached to the external sensor 43 is detected after the user gets off the autonomous driving vehicle 4. Consequently, the autonomous driving vehicle 4 can request a person outside the vehicle to wipe the external sensor 43. The autonomous driving vehicle 4 may include an external device that indicates information to the outside of the vehicle. In this case, the autonomous driving vehicle 4 may output wiping information to the external device of the autonomous driving vehicle 4.

The informing unit 41c may output wiping information to the management terminal 5 when dirt on the external sensor 43 or a raindrop attached to the external sensor 43 is detected when the autonomous driving vehicle 4 is operating to exit from the parking lot. Consequently, the autonomous driving vehicle 4 can request the manager, who is more likely to be present by the vehicle than the user when the autonomous driving vehicle 4 exits from the parking lot, to wipe the external sensor 43.

The autonomous driving unit 41a may evacuate the autonomous driving vehicle 4 to an evacuation position when dirt on the external sensor 43 or a raindrop attached to the external sensor 43 is detected while the autonomous driving vehicle 4 is subjected to the automated valet parking. The autonomous driving vehicle 4 is temporarily evacuated to a safe evacuation position when the field of view of the external sensor 43 is narrowed, since the automated valet parking may not be continued. The evacuation position is set in advance in the parking lot 50. At this time, the informing unit 41c may output wiping information to at least one of the user front-end 3, the external device of the autonomous driving vehicle 4, and the management terminal 5.

The configuration of the autonomous driving vehicle 4 is not limited to that discussed above as long as the automated valet parking can be implemented.

Process of Automated Valet Parking System (Automated Valet Parking Method)

FIG. 5 is a flowchart illustrating operation of the automated valet parking system. The flowchart illustrated in FIG. 5 is started when the autonomous driving vehicle 4 to be subjected to the service is specified.

First, as illustrated in FIG. 5, the parking lot management server 1 determines based on the content of a reservation related to the autonomous driving vehicle 4 whether the autonomous driving vehicle 4 is to enter the parking lot or to be returned in a determination process (step S10). When it is determined that the autonomous driving vehicle 4 is to enter the parking lot or to be returned (step S10: YES), it is determined that the autonomous driving vehicle 4 is in a scene in which an attached matter attached to the sensor is to be detected when the autonomous driving vehicle 4 enters the parking lot or is returned, and it is determined that the autonomous driving vehicle 4 is to be processed in a pattern A (step S12).

When it is determined that the autonomous driving vehicle 4 is not to enter the parking lot or to be returned (step S10: NO), the parking lot management server 1 determines based on the content of the reservation related to the autonomous driving vehicle 4 whether the autonomous driving vehicle 4 is to exit from the parking lot or to be called up in a determination process (step S14). When it is determined that the autonomous driving vehicle 4 is to exit from the parking lot or to be called up (step S14: YES), it is determined that the autonomous driving vehicle 4 is in a scene in which an attached matter attached to the sensor is to be detected when the autonomous driving vehicle 4 exits from the parking lot or is called up, and it is determined that the autonomous driving vehicle 4 is to be processed in a pattern B (step S16).

When it is determined that the autonomous driving vehicle 4 is not to exit from the parking lot or to be called up (step S14: NO), it is determined that the autonomous driving vehicle 4 is in a scene in which an attached matter attached to the sensor is to be detected during automated travel of the autonomous driving vehicle 4, and it is determined that the autonomous driving vehicle 4 is to be processed in a pattern C (step S18). When step S12, S16, or S18 is finished, the flowchart illustrated in FIG. 5 is ended.

Pattern A: Entry to Parking Lot or Return

FIG. 6 is a flowchart for the pattern A. The flowchart illustrated in FIG. 6 is started at the timing when it is determined that the autonomous driving vehicle 4 is to be processed in the pattern A in the flowchart illustrated in FIG. 5.

As illustrated in FIG. 6, the autonomous driving vehicle 4 acquires a present vehicle position in a position information acquisition process (step S20). The autonomous driving vehicle 4 acquires position information via a global positioning system (GPS) receiver or communication. The autonomous driving vehicle 4 determines whether an area (AVP service area) in which the automated valet parking service is provided has been reached based on the present vehicle position and map information on the AVP service area in an arrival determination process (step S22).

When it is determined that the AVP service area has been reached (step S22: YES), the autonomous driving vehicle 4 determines whether an attached matter such as dirt or a raindrop is attached to the external sensor 43 in an attached matter determination process (step S24). When it is determined that there is an attached matter (step S26: YES), the autonomous driving vehicle 4 informs the user in the vehicle in an informing process (step S28). The autonomous driving vehicle 4 displays a message on an in-cabin device (e.g. the HMI 48), or outputs a sound, to request the user to wipe off the dirt or the raindrop on the external sensor 43, by way of example. The autonomous driving vehicle 4 may transmit the message discussed above to the user front-end 3, and cause the user front-end 3 to display the message or output a sound.

Subsequently, the autonomous driving vehicle 4 determines whether the ignition is off (engine stopped state) and the doors are locked in a determination process (step S30). When it is not determined that the ignition is off (engine stopped state) and the doors are locked (step S30: NO), the autonomous driving vehicle 4 determines that the service cannot be started (wiping has not been completed), and continues the informing process (step S28). When it is determined that the ignition is off (engine stopped state) and the doors are locked (step S30: YES), the autonomous driving vehicle 4 determines that the service can be started (wiping has been completed), and transitions to a redetermination process (step S32).

The autonomous driving vehicle 4 determines whether an attached matter such as dirt or a raindrop is still present on the external sensor 43 in the redetermination process (step S32). When it is determined that an attached matter is still present (step S32: YES), the autonomous driving vehicle 4 informs the parking lot management center Ps in an informing process (step S34). The autonomous driving vehicle 4 outputs wiping information to the parking lot management server 1, by way of example. The parking lot management server 1 informs the user of the wiping information in an informing process (step S36).

When it is determined that an attached matter is not present (step S26: NO, step S32: NO), and when the informing process (step S36) is finished, the flowchart illustrated in FIG. 6 is ended. In this manner, the autonomous driving vehicle 4 can actively prompt the user to wipe off dirt, a raindrop, etc. before the AVP service is started.

Pattern B: Exit from Parking Lot or Call-up

FIG. 7 is a flowchart for the pattern B. The flowchart illustrated in FIG. 7 is started at the timing when it is determined that the autonomous driving vehicle 4 is to be processed in the pattern B in the flowchart illustrated in FIG. 5.

As illustrated in FIG. 7, the autonomous driving vehicle 4 turns on the ignition in a vehicle start process (step S40). Subsequently, the autonomous driving vehicle 4 determines whether an attached matter such as dirt or a raindrop is present on the external sensor 43 in an attached matter determination process (step S42). When it is determined that an attached matter is present (step S44: YES), the autonomous driving vehicle 4 informs the parking lot management center Ps in an informing process (step S46).

Subsequently, the autonomous driving vehicle 4 is stopped, and turns off the ignition (step S48). Then, the parking lot management server 1 informs the parking lot manager of the wiping information in an informing process (step S50).

When it is determined that an attached matter is not present (step S46: NO), and when the informing process (step S50) is finished, the flowchart illustrated in FIG. 7 is ended. In this manner, the autonomous driving vehicle 4 can actively prompt the parking lot manager to wipe off dirt, a raindrop, etc. before the AVP service is started.

Pattern C: Automated Travel

FIG. 8 is a flowchart for the pattern C. The flowchart illustrated in FIG. 8 is started at the timing when it is determined that the autonomous driving vehicle 4 is to be processed in the pattern C in the flowchart illustrated in FIG. 5.

As illustrated in FIG. 8, the autonomous driving vehicle 4 executes the same sequence as the pattern B as a vehicle start sequence (step S60). Subsequently, the autonomous driving vehicle 4 starts automated travel (step S62). The autonomous driving vehicle 4 determines whether an attached matter such as dirt or a raindrop is present on the external sensor 43 in an attached matter determination process (step S64). When it is determined that an attached matter is present (step S66: YES), the autonomous driving vehicle 4 informs the parking lot management center Ps in an informing process (step S68).

Subsequently, the autonomous driving vehicle 4 stops the vehicle, sets the shift position to P, notifies the parking lot management center Ps of a system abnormality, and turns off the ignition (step S70). Then, the parking lot management server 1 informs the parking lot manager of the wiping information in an informing process (step S72).

Subsequently, the parking lot management server 1 specifies a following vehicle to be affected by the autonomous driving vehicle 4 which is stopped, adjusts a travel route, and provides an instruction to the following vehicle in an avoidance process (step S74). Further, the parking lot management server 1 evacuates the autonomous driving vehicle 4 to a safe place. At this time, the parking lot manager can also remove the attached matter on the external sensor 43 of the autonomous driving vehicle 4.

Subsequently, the parking lot management server 1 determines whether the automated valet parking service for the autonomous driving vehicle 4 can be resumed in a determination process (step S76). The parking lot management server 1 inquires the autonomous driving vehicle 4 whether the attached matter on the external sensor 43 has been removed, and acquires the result. The parking lot management server 1 may confirm that the attached matter has been removed based on an image captured by the monitoring camera 12a. When it is determined that the automated valet parking service can be resumed (step S76: YES), the parking lot management server 1 instructs the autonomous driving vehicle 4 to resume (step S78).

Subsequently, the parking lot management server 1 determines whether the vehicle has exited from the parking lot in a determination process (step S80). When it is determined that the vehicle has exited from the parking lot (step S80: YES), the autonomous driving vehicle 4 determines whether an attached matter such as dirt or a raindrop is present on the external sensor 43 in an attached matter determination process (step S82). When it is determined that an attached matter is present (step S82: YES), the autonomous driving vehicle 4 informs the parking lot management center Ps in an informing process (step S84). The parking lot management server 1 informs the user of the wiping information in an informing process (step S86).

When it is determined that the automated valet parking service cannot be resumed (step S76: NO), when it is determined that an attached matter is not present (step S82: NO), and when the informing process (step S86) is finished, the flowchart illustrated in FIG. 8 is ended. In this manner, the autonomous driving vehicle 4 can actively prompt the user or the parking lot manager to wipe off dirt, a raindrop, etc. even while the AVP service is provided (the autonomous driving vehicle 4 is traveling).

Summary of Embodiment

In the autonomous driving vehicle 4, attachment of dirt or a raindrop to the external sensor 43 is detected before the automated valet parking is started. Then, information that suggests removing dirt on the external sensor 43 or a raindrop attached to the external sensor 43 is output in response to detecting the dirt on the external sensor 43 or the raindrop attached to the external sensor 43. Consequently, the output information is transmitted to a user that receives the parking service or a manager of the parking lot 50. That is, the autonomous driving vehicle 4 can prompt the user or the manager to wipe off the dirt, the raindrop, etc. In this manner, the autonomous driving vehicle 4 actively interacts with the user or the manager so that the external sensor 43 is rendered usable. As a result, interruption or discontinuation of the parking service can be avoided.

While an exemplary embodiment has been described above, the present disclosure is not limited to the exemplary embodiment discussed above, and may be subjected to various omissions, substitutions, and changes. For example, the autonomous driving vehicle 4 may be configured to output information that suggests removing dirt on the in-vehicle sensor or a raindrop attached to the in-vehicle sensor when the vehicle is to be parked independently without communicating with the parking lot management server 1.

What is claimed is:

1. A vehicle comprising:
   an in-vehicle sensor that detects an environment around the vehicle;
   an autonomous driving unit that executes automated valet parking based on a detection result from the in-vehicle sensor, the automated valet parking including determining that the vehicle is to be processed in one of a plurality of patterns including an entry to a parking lot or a return, an exit from the parking lot or is called up, or an automated travel pattern;
   a detection unit that detects dirt or a raindrop attached to the in-vehicle sensor before the automated valet parking is started by the autonomous driving unit, the detection of the dirt or the raindrop being based on:
   acquiring a field-of-view range of the in-vehicle sensor in advance and storing the range as a reference field-of-view range, and
   comparing an observed field-of-view range to the reference field-of-view range to determine whether the observed field-of-view range has become a predetermined proportion of the reference field-of-view range; and an informing unit that outputs information that suggests removing the dirt on the in-vehicle sensor or the raindrop attached to the in-vehicle sensor in response to the detection unit detecting the dirt on the in-vehicle sensor or the raindrop attached to the in-vehicle sensor, the informing unit is configured to:

output the information to an in-cabin device of the vehicle when the dirt on the in-vehicle sensor or the raindrop attached to the in-vehicle sensor is detected before a user gets off the vehicle; and output the information to at least one of a terminal of the user, an external device of the vehicle, and a terminal of a parking lot manager when the dirt on the in-vehicle sensor or the raindrop attached to the in-vehicle sensor is detected after the user gets off the vehicle.

2. The vehicle according to claim 1, wherein the informing unit outputs the information to the terminal of the parking lot manager when the dirt on the in-vehicle sensor or the raindrop attached to the in-vehicle sensor is detected when the vehicle is operating to exit from a parking lot.

3. The vehicle according to claim 1, wherein:
the autonomous driving unit evacuates the vehicle to an evacuation position when the dirt on the in-vehicle sensor or the raindrop attached to the in-vehicle sensor is detected during the automated valet parking of the vehicle.

4. The vehicle according to claim 1, wherein the vehicle determines whether an automated valet parking service area has been reached based on a present vehicle position and map information on the automated valet parking service area, the automated valet parking service area being an area in which an automated valet parking service is provided.

5. The vehicle according to claim 4, wherein the detection unit executes detection of dirt on the in-vehicle sensor or the raindrop attached to the in-vehicle sensor when the vehicle determines that the vehicle has reached the automated valet parking service area.

6. The vehicle according to claim 4, wherein the detection unit executes detection of dirt on the in-vehicle sensor or the raindrop attached to the in-vehicle sensor when ignition of the vehicle is turned on.

7. The vehicle according to claim 4, wherein the detection unit executes detection of dirt on the in-vehicle sensor or the raindrop attached to the in-vehicle sensor when the vehicle is autonomously driven by the autonomous driving unit.

8. An automated valet parking system comprising:
a server configured to be communicable with a vehicle; and
the vehicle for which automated valet parking is executable, the automated valet parking including determining that the vehicle is to be processed in one of a plurality of patterns including an entry to a parking lot or a return, an exit from the parking lot or is called up, or an automated travel pattern,
wherein the vehicle includes:
an in-vehicle sensor that detects an environment around the vehicle,
an autonomous driving unit that executes the automated valet parking based on a detection result from the in-vehicle sensor in response to a parking lot entry-exit instruction from the server, a detection unit that detects dirt or a raindrop attached to the in-vehicle sensor before the automated valet parking is started by the autonomous driving unit, the detection of the dirt or the raindrop being based on:
acquiring a field-of-view range of the in-vehicle sensor in advance and storing the range as a reference field-of-view range, and
comparing an observed field-of-view range to the reference field-of-view range to determine whether the observed field-of-view range has become a predetermined proportion of the reference field-of-view range, and an informing unit that outputs information that suggests removing the dirt on the in-vehicle sensor or the raindrop attached to the in-vehicle sensor in response to the detection unit detecting the dirt or the raindrop attached to the in-vehicle sensor, the informing unit is configured to:
output the information to an in-cabin device of the vehicle when the dirt on the in-vehicle sensor or the raindrop attached to the in-vehicle sensor is detected before a user gets off the vehicle; and
output the information to at least one of a terminal of the user, an external device of the vehicle, and a terminal of a parking lot manager when the dirt on the in-vehicle sensor or the raindrop attached to the in-vehicle sensor is detected after the user gets off the vehicle.

9. An automated valet parking method comprising:
executing automated valet parking based on a detection result from an in-vehicle sensor of a vehicle, the automated valet parking including determining that the vehicle is to be processed in one of a plurality of patterns including an entry to a parking lot or a return, an exit from the parking lot or is called up, or an automated travel pattern;
detecting dirt on the in-vehicle sensor of the vehicle or a raindrop attached to the in-vehicle sensor before the automated valet parking is started, the detecting of the dirt or the raindrop being based on:
acquiring a field-of-view range of the in-vehicle sensor in advance and storing the range as a reference field-of-view range, and
comparing an observed field-of-view range to the reference field-of-view range to determine whether the observed field-of-view range has become a predetermined proportion of the reference field-of-view range;
outputting information that suggests removing the dirt on the in-vehicle sensor or the raindrop attached to the in-vehicle sensor in response to detecting the dirt or the raindrop on the in-vehicle sensor attached to the in-vehicle sensor;
outputting the information to an in-cabin device of the vehicle when the dirt on the in-vehicle sensor or the raindrop attached to the in-vehicle sensor is detected before a user gets off the vehicle; and
outputting the information to at least one of a terminal of the user, an external device of the vehicle, and a terminal of a parking lot manager when the dirt on the in-vehicle sensor or the raindrop attached to the in-vehicle sensor is detected after the user gets off the vehicle.

* * * * *